(88.)
C. H. LATHAM & JOHN S. LUGG.
Improvement in Revolving Casters.
No. 4,656. Reissued Dec. 5, 1871.
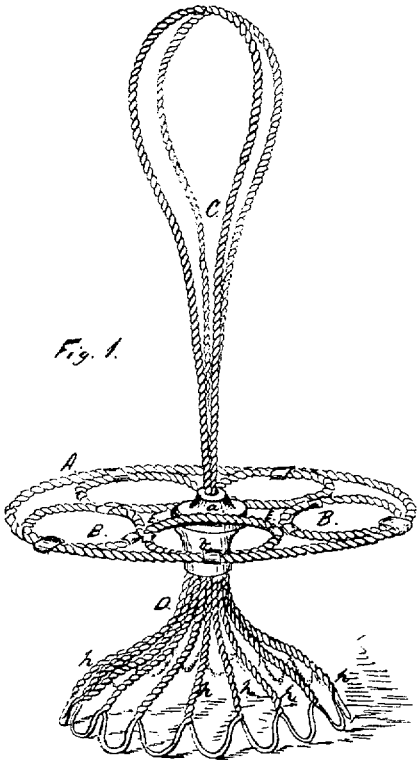
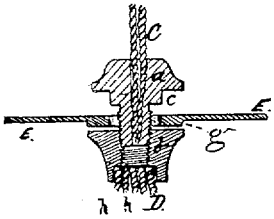
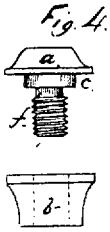
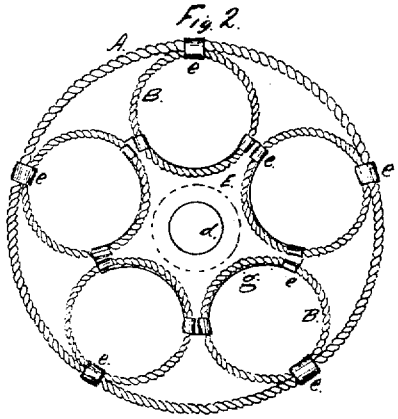
Witnesses, Edward E. Osborne
Robert H. Manners
Inventors C. H. Latham and J. S. Lugg
By E. A. Rugen Atty.
AM. PHOTO-LITHOGRAPHIC CO. N.Y. (OSBORNE'S PROCESS.)

UNITED STATES PATENT OFFICE.

CYRUS H. LATHAM AND JOHN S. LUGG, OF LOWELL, MASSACHUSETTS, ASSIGNORS TO EDWARD P. WOODS, DANIEL SHERWOOD, AND CYRUS H. LATHAM.

IMPROVEMENT IN REVOLVING CASTERS.

Specification forming part of Letters Patent No. 116,722, dated July 4, 1871; reissue No. 4,656, dated December 5, 1871.

DIVISION A.

*To all whom it may concern:*

Be it known that we, CYRUS H. LATHAM and JOHN S. LUGG, of Lowell, in the county of Middlesex and State of Massachusetts, have invented a new and useful Improved Revolving Caster, of which the following is a specification:

Our invention relates to a revolving table-caster composed chiefly of twisted iron or other wire; and it consists in a novel manner of constructing the same, having for its object the production of a table-caster both cheap and substantial, as well as highly ornamental, and capable of being readily taken apart and "nested" for transportation.

Figure 1 is a perspective view of our improved caster. Fig. 2 is a view of the revolving frame carrying the bottles. Figs. 3 and 4 represent the form and arrangement of the screw and nut, the former being a sectional view and the latter a side elevation.

The base of the caster is first formed in a machine which was patented to C. H. LATHAM April 18, 1871, to which reference is herewith made; and the special shape or configuration desired is given to it between dies or formers and then tinned or coated with metal. The ends of the wires *h*, forming the contracted part of the base D, have then a nut, *b*, cast upon them of sufficient size for the strength required. The base is then put upon a former and the nut *b* turned and screw-threaded for the spindle *a*; or the thread of the screw may be molded. In all cases where the thread of the nut can be molded or cast in the nut we prefer to do so, as it facilitates the operation of making the article. The holder for bottles is composed of a series of rings, B B, the outer parts clamped or secured to the outer ring A, and the inner parts to the plate E, which is provided with a central hole, *d*, which revolves upon the smooth portion *c* of the spindle *a*. The handle is composed of strands of wire twisted up and bent in the shape as plainly shown in the drawing. The screw-spindle *a*, made of corresponding size with the nut *b*, is bored or cast hollow to receive the ends of the handle-wires, which are inserted in place and soldered at the lower end in the screw *f*; or the handle may be cast to the part *a*, if desired. To the plate E, on the under side, is secured a washer, *g*, of proper thickness to give a suitable bearing for the plate E.

We have shown the rings B B as clasped to the outer ring A and plate E, but this forms no part of our invention, as the same is found in patents heretofore granted to others, which have been assigned to Woods, Sherwood & Co., the assignees of our invention.

Our aim has been to produce a revolving table-caster substantial and durable in all its parts, that could be sold at such a price as to be within the reach of all persons; and also to so construct it that it can be readily taken apart and nested, or the parts packed in small compass for shipment, thus making a great saving to manufacturers of them.

We are aware of the grant of the Letters Patent No. 88,912, dated April 13, 1869, the construction of which caster is entirely different from ours.

We do not wish to be understood as limiting ourselves to shape or configuration of the caster herein described, or the parts thereof, as the same may be varied, and also made to hold any desired number of bottles.

We claim as our invention—

As a new and improved article of manufacture, a revolving caster constructed of twisted or other wire, the parts of which are screwed together and capable of being readily disconnected, nested, and packed in small compass for shipment, substantially as described, and for the purposes specified.

CYRUS H. LATHAM.
JOHN S. LUGG.

Witnesses for J. S. LUGG:
ISAAC V. HOLMES,
HARRY CLARKE.
Witnesses for C. H. LATHAM:
L. A. MCARTHUR,
JAMES P. STEPHENS.